US009086686B2

(12) United States Patent
Kojima et al.

(10) Patent No.: US 9,086,686 B2
(45) Date of Patent: Jul. 21, 2015

(54) ELECTRONIC TIMEPIECE AND SECONDARY BATTERY UNIT (71) Applicant: SEIKO EPSON CORPORATION, Tokyo (JP)

(72) Inventors: Hiroyuki Kojima, Nagano (JP); Masaru Kubota, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/180,669

(22) Filed: Feb. 14, 2014

(65) Prior Publication Data

US 2014/0160903 A1 Jun. 12, 2014

Related U.S. Application Data (63) Continuation of application No. 13/606,857, filed on Sep. 7, 2012, now Pat. No. 8,693,292.

(30) Foreign Application Priority Data

Sep. 22, 2011 (JP) ................. 2011-206756

(51) Int. Cl.
  G04C 3/00    (2006.01)
  G04C 10/00   (2006.01)
  G04G 17/00   (2013.01)
  G04G 19/10   (2006.01)
  G04C 10/02   (2006.01)
  G04G 17/04   (2006.01)

(52) U.S. Cl.
  CPC .............. G04C 10/00 (2013.01); G04C 3/008 (2013.01); G04C 10/02 (2013.01); G04G 17/04 (2013.01); G04G 19/10 (2013.01)

(58) Field of Classification Search
  CPC ........ G04C 3/008; G04C 10/00; G04C 10/02; G04G 17/04; G04G 19/10
  USPC ................. 368/64, 66, 88, 203–205
  See application file for complete search history.

(56) References Cited

U.S. PATENT DOCUMENTS

| 3,780,519 | A | 12/1973 | Tokunaga |
| 4,015,420 | A * | 4/1977 | Walker ............................ 368/69 |
| 4,065,710 | A * | 12/1977 | Zytka ............................ 320/103 |
| 4,120,022 | A * | 10/1978 | Perkins et al. ................ 368/241 |
| 4,296,489 | A | 10/1981 | Mitsui |
| 4,362,396 | A * | 12/1982 | Perrot ............................ 368/203 |
| 4,477,195 | A | 10/1984 | Saitoh et al. |
| 5,062,090 | A * | 10/1991 | Komiyama ..................... 368/88 |
| 5,243,578 | A | 9/1993 | Mathez |
| 6,288,979 | B1 * | 9/2001 | Kwok ............................ 368/205 |
| 6,965,544 | B2 * | 11/2005 | Watanabe et al. ............... 368/88 |
| 7,523,321 | B2 * | 4/2009 | Nikazm et al. ................ 713/300 |
| 2006/0153011 | A1 | 7/2006 | Osa et al. |
| 2013/0021879 | A1 * | 1/2013 | Sugai ............................ 368/205 |

FOREIGN PATENT DOCUMENTS

JP          05-150055 A      6/1993

* cited by examiner

*Primary Examiner* — Vit W Miska
(74) *Attorney, Agent, or Firm* — Global IP Counselors, LLP (57) ABSTRACT A timepiece movement includes a battery housing section configured and arranged to house a primary battery and a secondary battery unit in a replaceable manner.

7 Claims, 7 Drawing Sheets

ELECTRONIC TIMEPIECE AND SECONDARY BATTERY UNIT

CROSS-REFERENCE TO RELATED APPLICATIONS

This is a continuation application of U.S. patent application Ser. No. 13/606,857 filed on Sep. 7, 2012. This application claims priority to Japanese Patent Application No. 2011-206756 filed on Sep. 22, 2011. The entire disclosures of U.S. patent Ser. No. 13/606,857 and Japanese Patent Application No. 2011-206756 are hereby incorporated herein by reference.

BACKGROUND

1. Technical Field

The present invention relates to an electronic timepiece and a secondary battery unit.

2. Background Technology

As a timepiece in which a solar battery is mounted, a solar-powered analog timepiece has been achieved by mounting a solar battery in an ordinary analog timepiece as a base, changing a power circuit to one having a battery charge function, and changing a battery a primary battery to a secondary battery (see Patent Document 1).

Japanese Laid-open Patent Application No. H05-150055 (Patent Document 1) is an example of the related art.

SUMMARY

In a case of employing the above-described structure, however, the electrode of the solar battery and the circuit block are electrically connected, and thus the base parts of the movement such as a main plate cannot be completely made common between an ordinary analog timepiece and a solar-powered analog timepiece. More specifically, in a case where the electrode of the solar battery and the circuit block are electrically connected, installation of a primary battery as a battery might cause charging current to flow from the solar battery to the primary battery, which results in breaking of the primary battery. Therefore, in a case of improperly installing a primary battery on a well-known solar-powered analog timepiece, generally, it is arranged that the solar battery and the circuit block is prevented from being electrically connected to the primary battery.

The invention has been made to address the above-described circumstances, and an advantage of the invention is to provide an electronic timepiece and a secondary battery unit in which the base parts of the movement such as a main plate can be made common between an ordinary analog timepiece and a solar-powered analog timepiece.

A timepiece movement according to one aspect includes a battery housing section configured and arranged to house a primary battery and a secondary battery unit in a replaceable manner.

BRIEF DESCRIPTION OF THE DRAWINGS

Referring now to the attached drawings which form a part of this original disclosure.

DETAILED DESCRIPTION OF EXEMPLARY EMBODIMENTS

Hereinafter, preferred embodiments of the invention will be explained in detail with reference to the attached drawings and the like. In each drawing, the dimension and the scale size of each component are appropriately different from the actual one. The embodiments described below are preferred specific examples of the invention, and thus include various limitations that are technically preferable. However, unless there is a specific description that the invention is limited in the following explanations, the scope of the invention is not limited to these embodiments.

Figure 1:
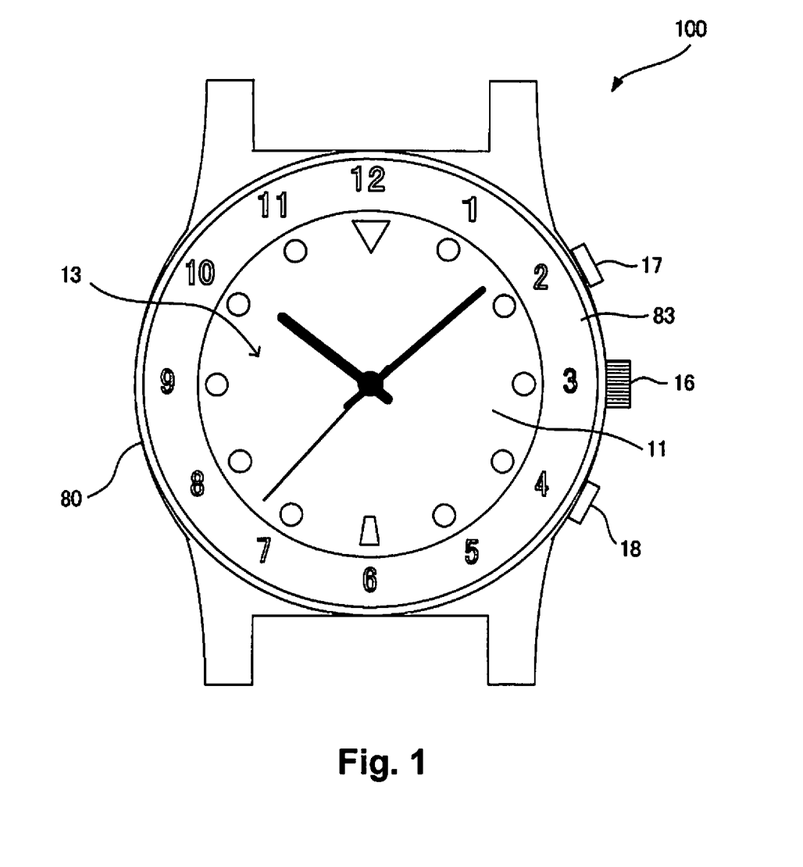
FIG. 1 is a plan view of an electronic timepiece 100 according to a first embodiment of the invention.

FIG. 1 is a plan view of a solar electronic timepiece 100 (hereinafter referred to as "electronic timepiece 100") according to an embodiment of the invention. As shown in FIG. 1, the electronic timepiece 100 has an external case 80. A disk-shaped faceplate 11 as a time indicating section is provided on the inner periphery side of the external case 80 such that an annular dial ring 83 stands therebetween. Indicator needles 13 (13a-c) are provided on the faceplate 11 so as to indicate the time, the date, and the like. The opening of the external case 80 on the front surface side is covered by a cover glass 84. The faceplate 11, the indicator needles 13 (13a-c), and a liquid crystal display panel 14 can be confirmed by sight through the cover glass 84. The faceplate 11 can be constructed of a non-conductive material.

The dial ring 83 has a flat annular portion on the outer periphery side to be in contact with the inner periphery surface of the external case 80, and the dial ring 83 also has a bowl portion inclined inward on the inner periphery side. In the electronic timepiece 100, internal time information and the like can be corrected by manually operating a crown 16 or operating buttons 17 and 18 shown in FIG. 1.

Figure 2:
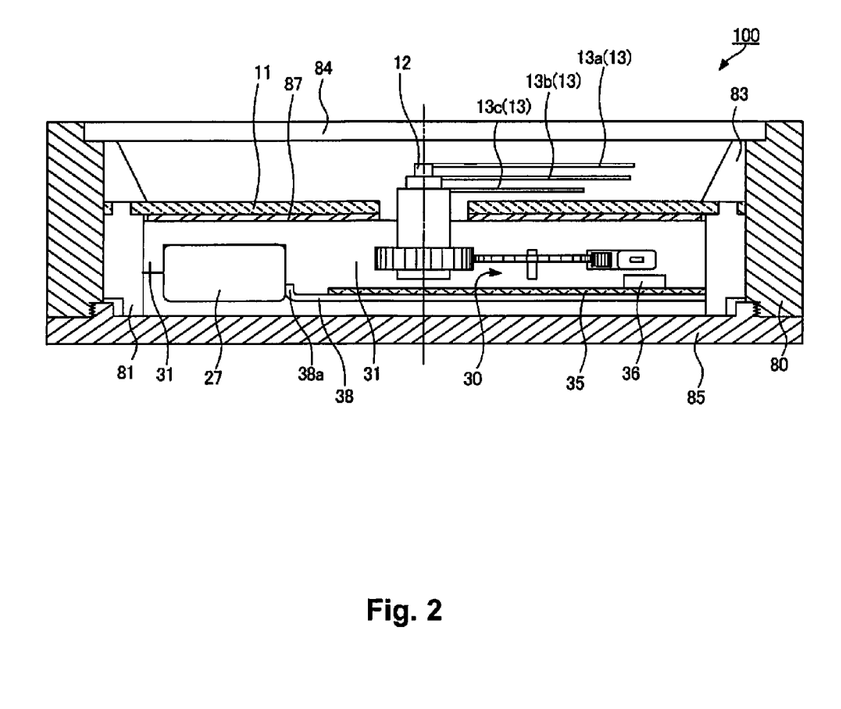
FIG. 2 is a partial cross-sectional view of the electronic timepiece 100.

FIG. 2 is a partial cross-sectional view showing the internal configuration of the electronic timepiece 100. As shown in FIG. 2, the annular dial ring 83 is attached along the inner periphery of the external case 80 in the electronic timepiece 100. The external case 80 has two openings. The opening on the front surface side is covered by the cover glass 84, and the opening on the back surface side is covered by a back lid 85 constructed of metal. The back lid 85 constructed of metal and the external case 80 constructed of metal are fixed by a screw groove.

The electronic timepiece 100 can house the secondary battery unit 27 including a secondary battery such as a lithium-ion battery, or a primary battery in a main plate 31. FIG. 2 shows an example where the secondary battery unit 27 is housed. The secondary battery unit 27 is charged with electric power generated by a solar panel 87 as described below. That is, solar charging is performed. The secondary battery unit 27 has a reverse-flow prevention diode 28 and a connecting spring 25 (coil spring) as described below (see FIG. 4). The solar panel 87 and the secondary battery unit 27 are electrically connected by the connecting spring 28. The reverse-flow prevention diode 28 and the connecting spring 25 serve as a charge controlling section that controls charging of the secondary battery. The connecting spring 25 is an example of the electrically conductive elastic member.

The electronic timepiece 100 has, inside the external case 80, the faceplate 11 having light permeability, an indicator needle shaft 12 that penetrates through the faceplate 11, a plurality of indicator needles 13 (second hand 13a, minute hand 13b, and hour hand 13c) that indicate the current time by revolving around the indicator needle shaft 12, and a drive mechanism 30 that drives the plurality of indicator needles 13 by rotating the indicator needle shaft 12. The indicator needle shaft 12 extends along the central shaft of the external case 80 in the front-back direction.

The faceplate 11 is a circular plate material that constitutes the time indicating section for indicating the time inside the external case 80. The faceplate 11 is constructed of a material having light permeability such as plastics. The indicator needles 13 (13a-c) stand between the faceplate 11 and the cover glass 84. The faceplate 11 is provided inside the dial ring 83. A hole is formed in the central portion of the faceplate 11 so that the indicator needle shaft 12 can penetrate therethrough.

The drive mechanism 30 is attached to the main plate 31, and has a step motor and train wheels such as a gear. The step motor rotates the plurality of indicator needles 13 through the train wheels, and thereby drives the plurality of indicator needles 13. Specifically, the hour hand 13c makes a revolution every 12 hours, the minute hand 13b makes a revolution every 60 minutes, and the second hand 13a makes a revolution every 60 seconds. The main plate 31, to which the drive mechanism 30 is attached, is positioned such that the faceplate 11 stands between the main plate 31 and the indicator needles 13.

Driving of the drive mechanism 30 is controlled by an indication controlling section 36 provided on a circuit substrate 35. The positive potential of the indication controlling section 36 is connected to a positive terminal of the secondary battery unit 27 through a positive side contact terminal 38a formed under the circuit substrate 35. The negative potential of the indication controlling section 36 is connected to a negative terminal of the secondary battery unit 27 through a negative side contact terminal 41 of a plate spring 40 described below.

The electronic timepiece 100 has a solar panel 87 that performs photovoltaics inside the external case 80. The solar panel 87 is a circular flat plate in which a plurality of solar cells (photovoltaic elements) are connected in series, and the solar cells convert optical energy into electric energy (electric power). The solar panel 87 is provided between the faceplate 11 and the drive mechanism 30, and extends along the transverse plane of the indicator needle shaft 12. The solar panel 87 is provided inside the dial ring 83 in the extending direction.

Figure 3:
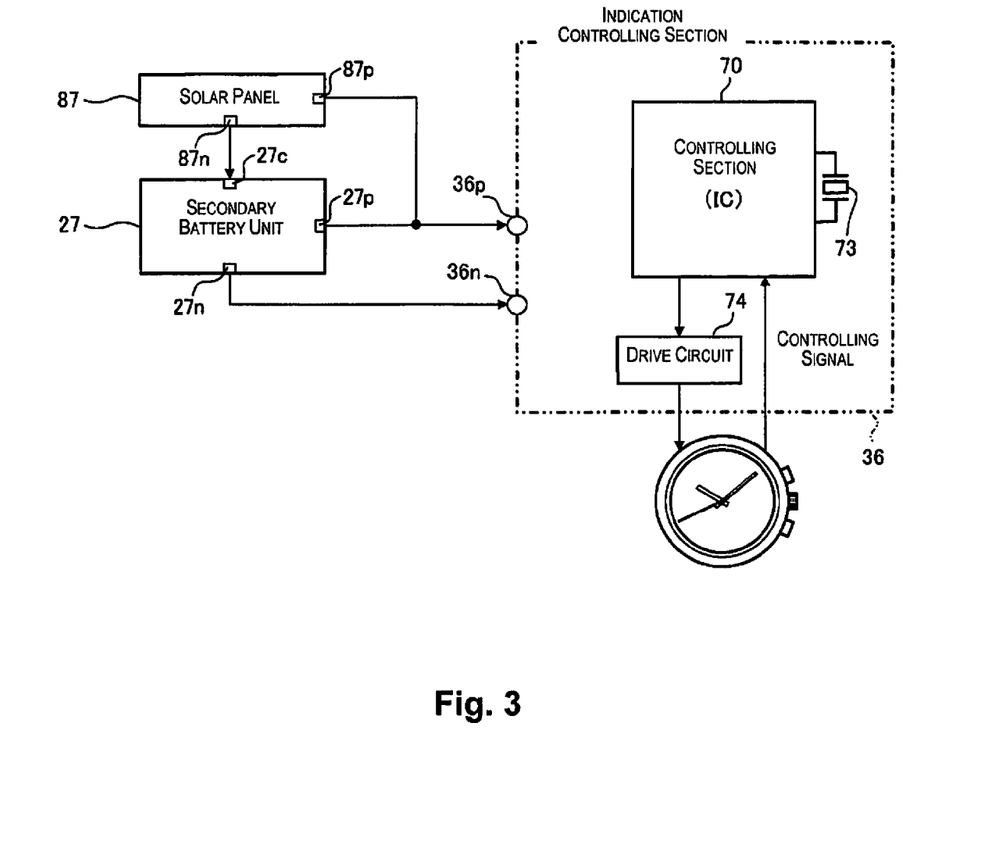
FIG. 3 is a block diagram showing a circuit configuration of the electronic timepiece 100.

FIG. 3 is a block diagram showing a circuit configuration of the electronic timepiece 100. The indication controlling section 36 is provided with a positive supply terminal 36p, a negative supply terminal 36n, a controlling section 70, a drive circuit 74 and a quartz crystal unit 73. A high potential power source is supplied to the positive supply terminal 36p, and a low potential power source is supplied to the negative supply terminal 36n. The indication controlling section 36 is operated by electric power supplied to the positive supply terminal 36p and the negative supply terminal 36n. A regulator can be provided in the indication controlling section 36 to stabilize the voltage supplied to the positive supply terminal 36p and the negative supply terminal 36n and supply to the controlling section 70 and the drive circuit 74.

The controlling section 70 is constructed of an IC and the quartz crystal unit 73, for example. The controlling section 70 controls driving of all the indicator needles 13 through the drive circuit 74 based on reference clock signals generated by the quartz crystal unit 73.

The solar panel 87 has a negative supply terminal 87n (first supply terminal) that outputs low potential, and a positive supply terminal 87p (second supply terminal) that outputs high potential. The solar panel 87 supplies the generated electric power to the secondary battery unit 27.

The secondary battery unit 27 has a positive terminal 27p electrically connected to the positive supply terminal 87p of the solar panel 87, a charge controlling terminal 27c electrically connected to the negative supply terminal 87n of the solar panel 87, and a negative terminal 27n electrically connected to the negative supply terminal 36n of the indication controlling section 36. The secondary battery is provided between the positive terminal 27p and the negative terminal 27n. The electric power generated in the solar panel 87 is charged to the second battery. If the solar panel 87 cannot generate electric power because of indoor use or the weather, the secondary battery unit 27 supplies electric power to the indication controlling section 36.

The indication controlling section 36 is provided with the positive supply terminal 36p, the negative supply terminal 36n, the controlling section 70, the drive circuit 74, and the quartz crystal unit 73. A high potential power source is supplied to the positive supply terminal 36p, and a low potential power source is supplied to the negative supply terminal 36n. The indication controlling section 36 is operated by electric power supplied to the positive supply terminal 36p and the negative supply terminal 36n.

Figure 4:
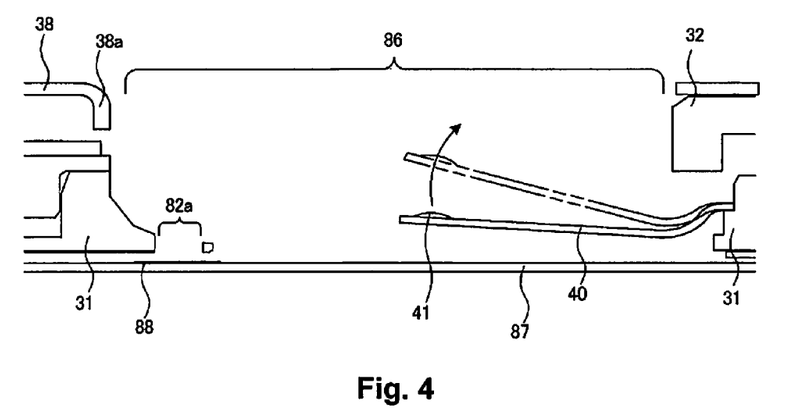
FIG. 4 is a partial cross-sectional view of the vicinity of a battery housing section 86 of the electronic timepiece 100.

FIG. 4 is a cross-sectional view showing the details of the battery housing section 86 that houses the second battery unit 27 or the primary battery. In FIG. 4, the view is turned upside down with respect to the electronic timepiece 100 shown in FIG. 2. The battery housing section 86 of the second battery unit 27 is formed in the main plate 31 that is provided inside the external case 80. The battery housing section 86 has a guiding hole 82a formed in the main plate 31, and the connecting spring 25 of the second battery unit 27 is inserted into the guiding hole 82a. In this manner, the position of the second battery unit 27 is fixed, and thus improper installation can be prevented. A contact section 88 of the solar panel 87 is formed in a position that corresponds to the guiding hole 82a. The contact section 88 is electrically connected to the negative supply terminal 87n (not shown in the drawing) of the solar panel 87. The contact section 88 is constructed of a conductive material.

The main plate 31 has the plate spring 40 that is provided with the negative side contact terminal 41. The plate spring 40 is electrically connected to the negative supply terminal 36n of the indication controlling section 36. The negative side contact terminal 41 and the plate spring 40 are constructed of a conductive material. In this embodiment, the negative supply terminal 36n of the indication controlling section 36 is electrically connected to the plate spring 40, and biased toward a direction shown by the arrow in FIG. 4. Consequently, even if either one of the second battery unit 27 and the primary battery that have a different thickness is housed in the battery housing section 86, it can be electrically connected to the negative supply terminal 36n of the indication controlling section 36. The second battery unit 27 and the primary battery are retained by the main plate 31, a train wheel receiver 32, a positive terminal 38, and the plate spring 40. The contact section 88 is positioned such that the contact section 88 is not in contact with the primary battery in a case where the primary battery is housed in the battery housing section 86, and the contact section 88 is in contact with the connecting spring 25 of the secondary battery unit 27 in a case where the secondary battery unit 27 is housed in the battery housing section 86.

Figure 5:
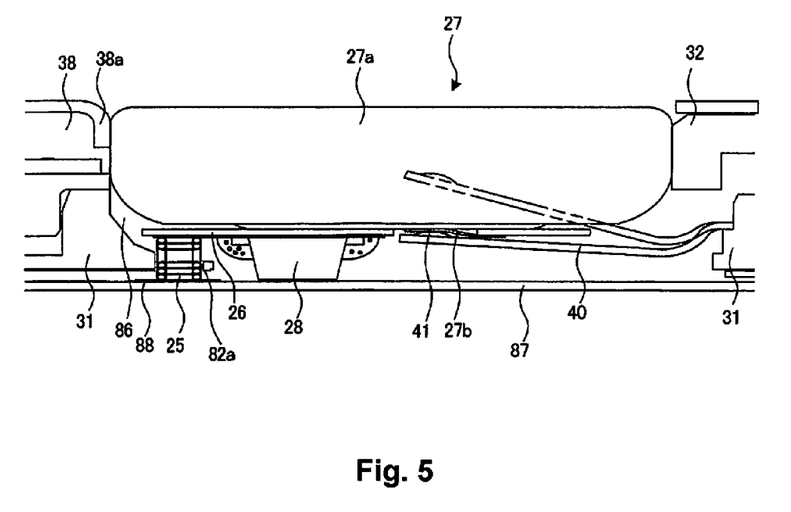
FIG. 5 is a partial cross-sectional view showing a state where a secondary battery unit 27 is housed in the battery housing section 86.

FIG. 5 is a cross-sectional view of the battery housing section 86 in a state where the secondary battery unit 27 is housed therein. The secondary battery unit 27 has a base plate 26, the connecting spring 25 connected to the base plate 26, the reverse-flow prevention diode 28, and the negative terminal 27n. The connecting spring 25 and the negative terminal 27n are constructed of a conductive material.

When the secondary battery unit 27 is housed in the battery housing section 86, the negative side contact terminal 41 of the plate spring 40 is brought into contact with the negative terminal 27n of the secondary battery unit 27. Consequently, the negative terminal 27n of the secondary battery unit 27 is electrically connected to the negative supply terminal 36n of the indication controlling section 36. Also, the connecting spring 25 is brought into contact with the contact section 88. Consequently, the negative supply terminal 87n of the solar panel 87 is electrically connected to the charge controlling terminal 27c of the secondary battery unit 27.

The positive terminal 38 is electrically connected to a positive potential power supply line of the indication controlling section 36 (not shown in the drawing). It is arranged that when the secondary battery unit 27 is housed in the battery housing section 86, the positive side contact terminal 38a of the positive terminal 38 is brought into contact with the positive terminal of the secondary battery unit 27 (the positive electrode of the secondary battery).

Figure 6:
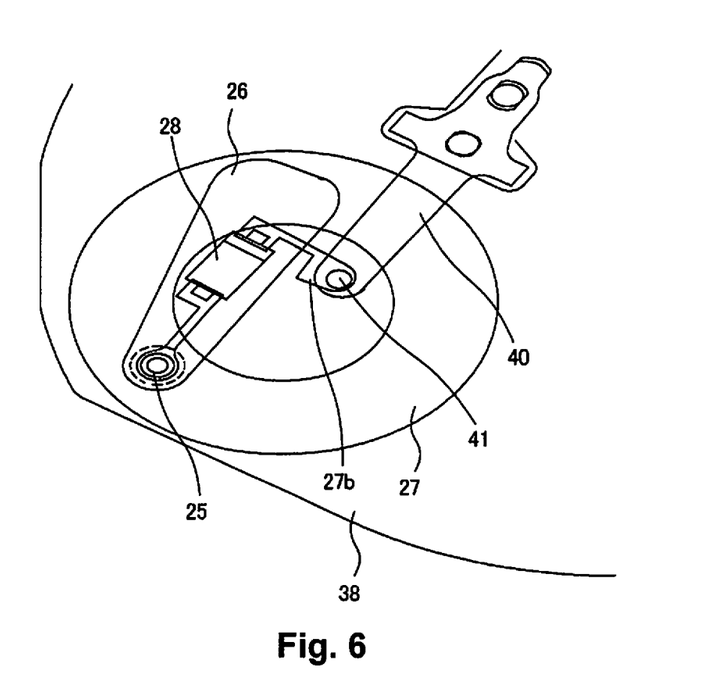
FIG. 6 is a perspective view showing a state where the secondary battery unit 27 is housed with respect to the electronic timepiece 100.

FIG. 6 is a schematic perspective view showing a contact state of the plate spring 40, the reverse-flow prevention diode 28 and the connecting spring 25 in a case where the secondary battery unit 27 is housed in the battery housing section 86. As shown in FIG. 6, one terminal (cathode) of the reverse-flow prevention diode 28 is connected to the solar panel 87 through the connecting spring 25, and the other terminal (anode) of the reverse-flow prevention diode 28 is connected to the negative supply terminal 36n of the indication controlling section 36 through the plate spring 40.

Figure 7:
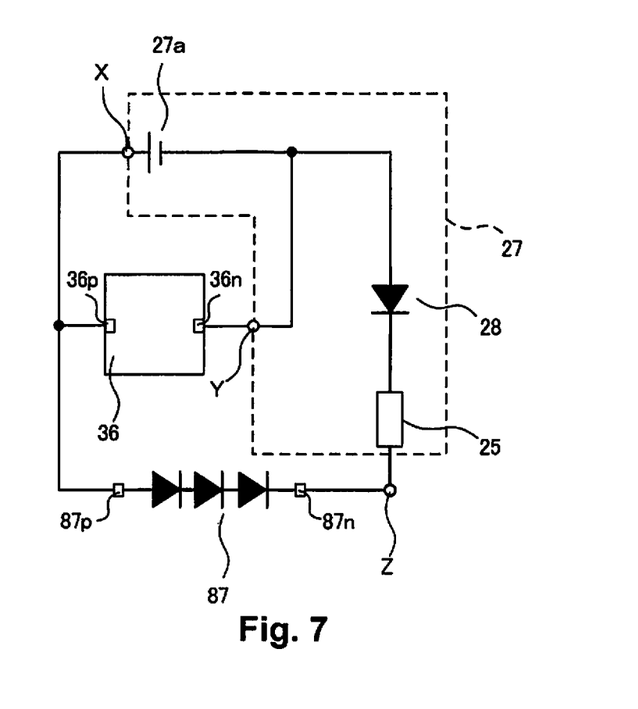
FIG. 7 is a circuit diagram of a state where the secondary battery unit 27 is housed in the battery housing section 86.

FIG. 7 is a circuit diagram of a case where the secondary battery unit 27 is housed in the battery housing section 86. The contact point X is a contact point between the positive side contact terminal 38a of the main plate 31 and the secondary battery unit 27. The contact point Y is a contact point between the negative side contact terminal 41 of the plate spring 40 and the negative terminal 27n of the secondary battery unit 27. The contact point Z is a contact point between the connecting spring 25 and the contact section 88 of the solar panel 87.

As shown FIG. 7, the positive electrode of the secondary battery 27a of the secondary battery unit 27 is connected to the positive supply terminal 36p of the indication controlling section 36 and the positive supply terminal 87p of the solar panel 87 through the contact point X. The negative electrode of the secondary battery 27a is electrically connected to the negative supply terminal 36n of the indication controlling section 36 through the contact point Y. The negative electrode of the secondary battery 27a is connected to the negative supply terminal 87n of the solar panel 87 through the reverse-flow prevention diode 28, the connecting spring 25, and the contact point Z.

As a result, the secondary battery unit 27 is charged by the solar panel 87 while preventing reverse flow of electric current from the secondary battery unit 27 to the solar panel 87. Also, electric power is supplied from the secondary battery unit 27 to the indication controlling section 36. In the present embodiment, the maximum output voltage of the solar panel 87 is set not to exceed the withstanding voltage of the secondary battery unit 27. Here, $Vmax<Vx+Vd$ is satisfied, where the maximum output voltage is $Vmax$, the withstanding voltage of the secondary battery 27a is $Vx$, and the decreasing voltage of the reverse-flow prevention diode 28 is $Vd$. Alternatively, $Vmax<Vx$ is acceptable. This can be achieved, for example, by using an amorphous silicon solar battery as the solar panel 87, setting its maximum output voltage to be 2.4 V, and using a battery having a charge limitation of 2.6 V as the secondary battery 27a.

Figure 8:
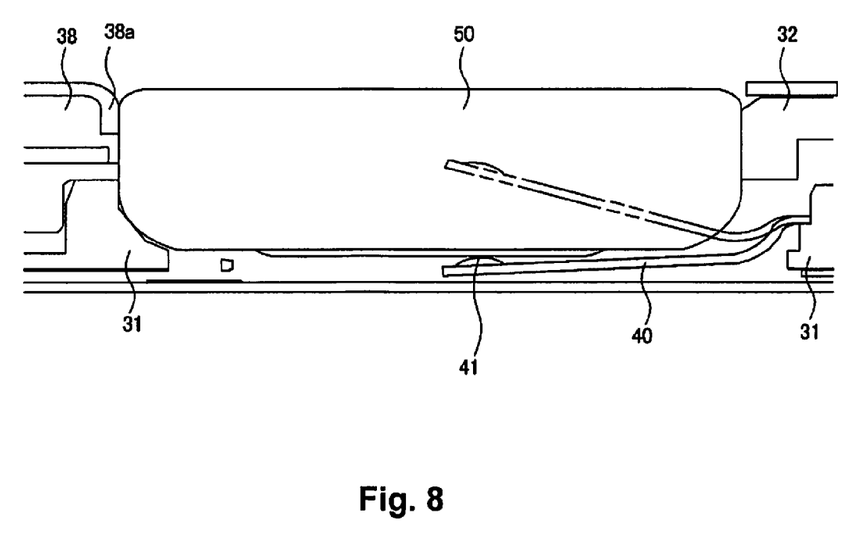
FIG. 8 is a partial cross-sectional view of a state where a primary battery 50 is housed in the battery housing section 86.

FIG. 8 is a cross-sectional view of a state where the primary battery 50 is housed in the battery housing section 86. As shown in FIG. 8, the primary battery 50 has the same diameter as the secondary battery unit 27. The primary battery 50 is not provided with a connecting spring and a reverse-flow prevention diode. The thickness of the primary battery 50 is greater than the thickness of the secondary battery unit 27.

When the primary battery 50 is housed in the battery housing section 86, the primary battery 50 is retained by bringing a tapered portion of the main plate 31 into contact with the primary battery 50. In this state where the primary battery 50 is retained, the negative side contact terminal 41 of the plate spring 40 and the negative electrode of the primary battery 50 are in contact with each other. Further, the positive side contact terminal 38a of the positive terminal 38 and the positive electrode of the primary battery 50 are in contact with each other.

Figure 9:
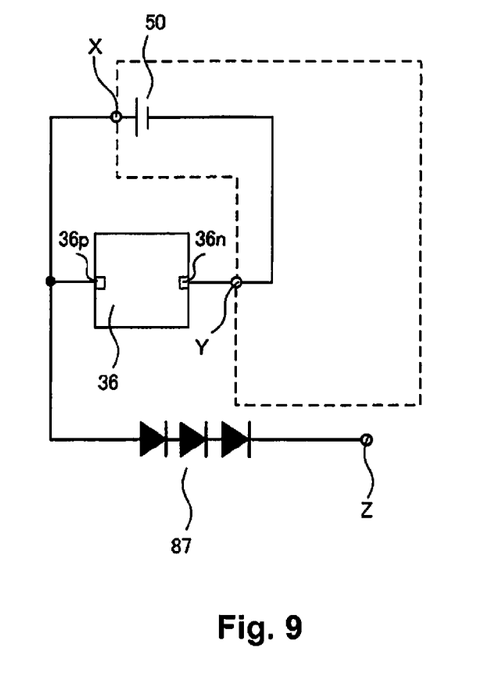
FIG. 9 is a circuit diagram of a state where the primary battery unit 50 is housed in the battery housing section 86.

FIG. 9 is a circuit diagram of a case where the primary battery 50 is housed in the battery housing section 86. In FIG. 9, the contact point X is a contact point between the positive side contact terminal 38a of the positive terminal 38 and the positive terminal of the primary battery 50. The contact point Y is a contact point between the negative side contact terminal 41 of the plate spring 40 and the negative terminal of the primary battery 50. The positive terminal of the primary battery 50 is electrically connected to the positive supply terminal 36p of the indication controlling section 36 through the contact point X. The negative electrode of the primary battery 50 is electrically connected to the negative supply terminal 36n of the indication controlling section 36 through the contact point Y. However, since the connecting spring 25 is not provided in the primary battery 50, the primary battery 50 and the solar panel 87 are not connected. Thus, the charging current does not flow from the solar panel 87 to the primary battery 50, which makes it possible to prevent defects such as breaking of the primary battery 50. In this manner, in a case where the primary battery 50 is housed in the battery housing section 86, electric power is supplied from the primary battery 50 to the indication controlling section 36.

As described above, the present embodiment employs the secondary battery unit 27 in which the secondary battery 27a and the base plate 26 provided with the reverse-flow prevention diode 28 are integrated. Also, the connecting spring 25 is provided in the secondary battery unit 27 so as to be electrically connected to the solar panel 87. Consequently, all parts of the movement except for a battery can be made common between a primary battery electronic timepiece and a solar panel electronic timepiece. As a result, significant cost reduction can be achieved.

Figure 10:
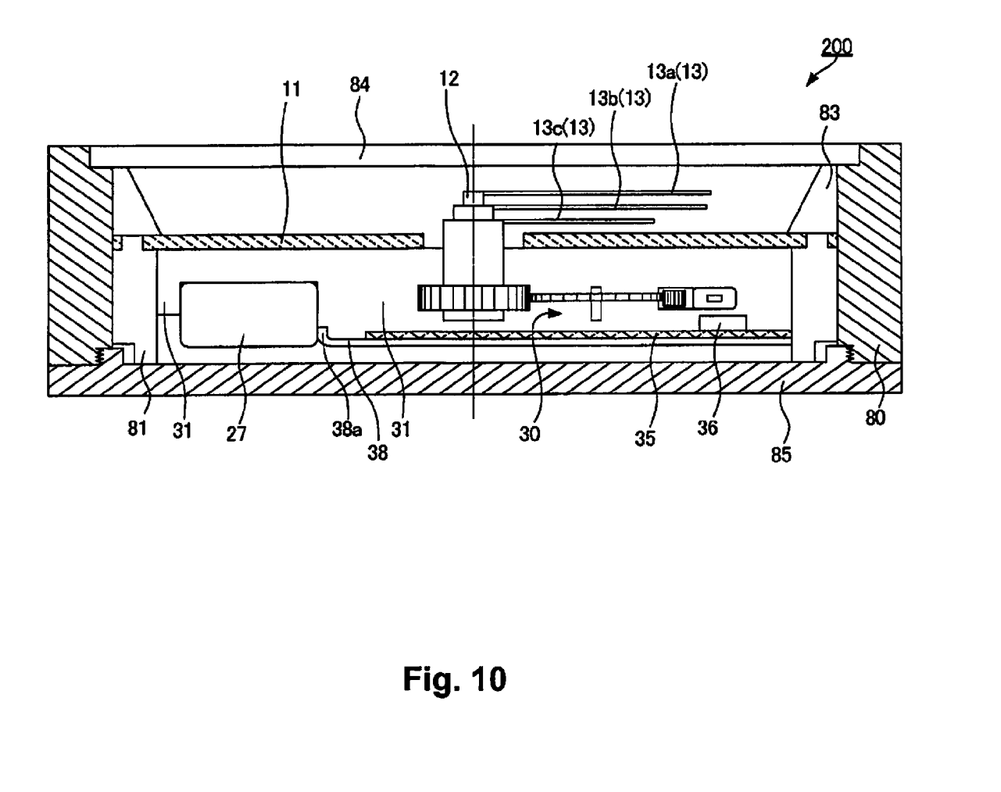
FIG. 10 is a cross-sectional view of a primary battery electronic timepiece 200.

FIG. 10 is a cross-sectional view of a primary battery electronic timepiece. The primary battery electronic timepiece 200 shown in FIG. 10 uses parts that are identical to the parts of the solar panel electronic timepiece 100 shown in FIG. 2. Even if the secondary battery unit 27 instead of the primary battery 50 is housed in the primary battery electronic timepiece 200, the connecting spring 25 is only brought into contact with the non-conductive faceplate 11. Accordingly, the primary battery electronic timepiece 200 can be operated if the secondary battery 27a is charged.

The movement of the timepiece of the present embodiment serves as an analog timepiece in a case where the primary battery 50 is installed, and serves as a solar panel electronic timepiece in a case where the secondary battery unit 27 is installed. Consequently, the movement of the timepiece of the present embodiment provides very broad utility, which can significantly improve the production efficiency. In particular, in a case where a secondary battery is damaged and needs to be replaced but another battery is not available right away, the solar panel electronic timepiece 100 can be operated securely by housing the primary battery 50 instead of the secondary battery unit 27.

As described above, an electronic timepiece according to the illustrated embodiment has an external case; a time indicating section that indicates the time inside the external case; a solar panel that is housed in the external case and provided with a first supply terminal and a second supply terminal; a contact section that is electrically connected to the first supply terminal; an indication controlling section that operates the time indicating section; and a battery housing section that is provided in a main plate and can house a secondary battery unit provided with a secondary battery and a primary battery as a battery in a replaceable manner. The battery housing section has a positive side contact terminal that is electrically connected to a positive supply terminal of the indication controlling section and configured such that the positive side contact terminal can be brought into contact with a positive terminal of the battery housed in the battery housing section; and a negative side contact terminal that is electrically connected to a negative supply terminal of the indication controlling section and configured such that the negative side contact terminal can be brought into contact with a negative terminal of the battery housed in the battery housing section. The second supply terminal of the solar panel is electrically connected to the positive side contact terminal. The contact section is positioned such that the contact section is not in contact with the primary battery in a case where the primary battery is housed in the battery housing section, and the contact section is in contact with a charge controlling section of the secondary battery unit in a case where the secondary battery unit is housed in the battery housing section.

In this electronic timepiece, when the secondary battery unit is housed in the battery housing section, the positive terminal of the secondary battery unit is electrically connected to the positive supply terminal of the indication controlling section. Further, the negative terminal of the secondary battery unit is electrically connected to the negative supply terminal of the indication controlling section. Furthermore, the charge controlling section of the secondary battery unit is electrically connected to the contact section. On the other hand, when the primary battery is housed in the battery housing section, the positive terminal of the primary battery is electrically connected to the positive supply terminal of the indication controlling section. Further, the negative terminal of the primary battery is electrically connected to the negative supply terminal of the indication controlling section. However, since the contact section is positioned such that the contact section is not in contact with the primary battery even if the primary battery is housed, the solar panel and the primary battery is electrically separated. As described above, according to the illustrated embodiment, it is possible to make the base parts of the movement such as a main plate common between an ordinary primary battery timepiece and a solar panel electronic timepiece, and thus achieve significant cost reduction. Also, since the base parts of the movement such as a main plate have broad utility, the production efficiency can be improved.

The "time indicating section" includes a faceplate of a timepiece, and time indication on the faceplate includes indication by indicator needles, digital indication by liquid crystal and the like. The indicator needles include an hour hand, a minute hand, and a second hand.

In the secondary battery unit, preferably, the positive terminal of the battery is a positive electrode of the secondary battery. If the charge controlling section has an electrically conductive elastic member that can be brought into contact with the contact section and has a limiting circuit that is provided between the elastic member and a negative electrode of the secondary battery so as to limit charging of the secondary battery to a predetermined condition, preferably, a guiding section is provided in the main plate so as to guide the elastic member to the contact section. In this case, since the elastic member is guided to the contact section by the guiding section, it is possible to prevent the secondary battery unit from being improperly installed.

In the above-described electronic timepiece, preferably, there is an electrically conductive plate spring for biasing the battery to the main plate, the electrically conductive plate spring being electrically connected to the negative supply terminal of the indication controlling section, and the negative side contact terminal is a contact terminal that is provided in the plate spring. The plate spring can achieve good contact whether the secondary battery unit or the primary battery having a different thickness is housed.

In the above-described electronic timepiece, preferably, a maximum output voltage of the solar panel is set not to exceed the withstanding voltage of the secondary battery. It is thus possible to prevent the secondary voltage from being damaged.

Next, a secondary battery unit of the illustrated embodiment can be housed in a battery housing section of an electronic timepiece that has an external case; a time indicating section that indicates the time inside the external case; a solar panel that is housed in the external case and provided with a first supply terminal and a second supply terminal; a contact section that is electrically connected to the first supply terminal; an indication controlling section that operates the time indicating section; a positive side contact terminal that is provided in the battery housing section and electrically connected to a positive supply terminal of the indication controlling section; and a negative side contact terminal that is provided in the battery housing section and electrically connected to a negative supply terminal of the indication controlling section, the battery housing section being provided in a main plate. The secondary battery unit has a negative terminal that is in contact with the negative side contact terminal; a secondary battery in which a positive electrode is in contact with the positive side contact terminal and a negative electrode is electrically connected to the negative terminal; an electrically conductive elastic member that can be brought into contact with the contact section; and a limiting circuit that is provided between the elastic member and the negative electrode of the secondary battery so as to limit charging of the secondary battery to a predetermined condition. According to this embodiment, since the limiting circuit and the elastic member are provided in the secondary battery unit, electric power generated in the solar panel can be stored in the secondary battery by bringing the contact section electrically connected to the solar panel into contact with the elastic member.

In the above-described secondary battery unit, preferably, the limiting circuit is a diode in which an anode is electrically connected to the negative electrode of the secondary battery and a cathode is electrically connected to the elastic member. In this case, it is possible to prevent the secondary battery from being broken due to reverse flow of electric current.

In the above-described secondary battery unit, preferably, the sum of the withstanding voltage of the secondary battery and the decreasing voltage of the diode is greater than the maximum output voltage of the solar panel. In this case, it is possible to prevent the secondary battery from being damaged by the generated voltage of the solar panel. Further, in the above-described secondary battery unit, preferably, the elastic member is a coil spring. In this case, good contact can be achieved by the elastic force of the coil spring.

What is claimed is:

1. A timepiece movement comprising:
   a universal battery housing section having a battery support portion and an access portion, the universal battery housing section being configured and arranged to interchangeably house a primary battery and a secondary battery unit having a secondary battery and a conductive part that is electrically coupled to the secondary battery for charging the secondary battery,
   the primary battery being supported by the battery support portion outside the access portion while the universal battery housing section houses the primary battery,
   the conductive part of the secondary battery unit being disposed through the access portion while the universal battery housing section houses the secondary battery unit.

2. The timepiece movement according to claim 1, wherein
   the secondary battery is configured and arrange to be charged with electric power generated by a solar panel,
   the secondary battery unit further includes a reverse-flow prevention diode configured and arranged to prevent reverse flow of electric current from the secondary battery to the solar panel, and
   the conductive part includes a connecting spring.

3. The timepiece movement according to claim 2, wherein
   a maximum output voltage of the solar panel is set not to exceed a withstanding voltage of the secondary battery.

4. The timepiece movement according to claim 3, wherein
   a sum of the withstanding voltage of the secondary battery and a decreasing voltage of the reverse-flow prevention diode is greater than the maximum output voltage of the solar panel.

5. The timepiece movement according to claim 1, further comprising
   an external case in which the solar panel is housed,
   wherein a first timepiece movement state in which the secondary battery unit is used in the battery housing section and a second timepiece movement state in which the primary battery is used are switchable.

6. An electronic timepiece including the timepiece movement according to claim 1.

7. A secondary battery unit mounted in the timepiece movement according to claim 1.

* * * * *